(12) United States Patent
Hodoshima

(10) Patent No.: US 11,576,113 B2
(45) Date of Patent: Feb. 7, 2023

(54) COMMUNICATION APPARATUS, ACCESS POINT MANAGEMENT APPARATUS, SELECTIVE COMMUNICATION CONNECTION METHOD, AND NON-TRANSITORY COMPUTER READABLE MEDIUM

(71) Applicant: NEC Platforms, Ltd., Kawasaki (JP)

(72) Inventor: Takeshi Hodoshima, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 99 days.

(21) Appl. No.: 17/252,937

(22) PCT Filed: Sep. 4, 2019

(86) PCT No.: PCT/JP2019/034770
§ 371 (c)(1),
(2) Date: Dec. 16, 2020

(87) PCT Pub. No.: WO2020/059492
PCT Pub. Date: Mar. 26, 2020

(65) Prior Publication Data
US 2021/0120483 A1 Apr. 22, 2021

(30) Foreign Application Priority Data
Sep. 18, 2018 (JP) .............................. JP2018-173806

(51) Int. Cl.
*H04W 48/16* (2009.01)
*H04W 48/20* (2009.01)
(Continued)

(52) U.S. Cl.
CPC ........... *H04W 48/16* (2013.01); *H04W 48/20* (2013.01); *H04W 72/10* (2013.01); *H04W 76/10* (2018.02); *H04W 84/12* (2013.01); *H04W 88/08* (2013.01)

(58) Field of Classification Search
CPC ... H04W 48/18; H04W 76/10; H04W 40/248; H04W 48/20; H04W 72/08; H04W 84/12;
(Continued)

(56) References Cited

U.S. PATENT DOCUMENTS

2015/0222527 A1\* 8/2015 Shah .................... H04L 47/2416
370/338
2016/0182313 A1\* 6/2016 Chen ..................... H04W 28/24
455/436
(Continued)

FOREIGN PATENT DOCUMENTS

JP 10-41969 A 2/1998
JP 2015-019141 A 1/2015
(Continued)

OTHER PUBLICATIONS

International Search Report for PCT/JP2019/034770, dated Nov. 26, 2019.

*Primary Examiner* — Daniel Lai
(74) *Attorney, Agent, or Firm* — Sughrue Mion, PLLC

(57) ABSTRACT

A communication apparatus according to the present disclosure functions as an access point, transmits/receives information to be shared that should be shared with another access point when a radio communication connection has been requested from a first client, and calculates, for the access point and the other access point, scores that indicate priority as a connection destination of the first client using the information to be shared. Then it is determined whether it is necessary to establish the radio communication connection with the first client based on the above scores and establishes, when it is determined that it is necessary to establish the radio communication connection, the radio communication connection with the first client.

7 Claims, 15 Drawing Sheets

(51) Int. Cl.
   *H04W 84/12*   (2009.01)
   *H04W 88/08*   (2009.01)
   *H04W 76/10*   (2018.01)
   *H04W 72/10*   (2009.01)

(58) Field of Classification Search
   CPC . H04W 36/36; H04W 36/08; H04W 28/0236; H04W 88/08; H04W 28/0289; H04W 36/0058; H04W 24/02; H04W 24/04; H04W 28/0231; H04W 28/0268; H04W 28/08; H04W 52/243; H04W 48/16; H04W 72/10; H04W 76/36
   See application file for complete search history.

(56) References Cited

U.S. PATENT DOCUMENTS

2018/0359698 A1* 12/2018 Patwardhan .......... H04W 28/22
2020/0137766 A1*  4/2020 Gokturk .............. H04W 72/085

FOREIGN PATENT DOCUMENTS

| JP | 6233901 B1 | 11/2017 |
| JP | 2018-033088 A | 3/2018 |

* cited by examiner

<CL INFORMATION TABLE>

| INFORMATION ON CONNECTION REQUEST CL | | INFORMATION ON CONNECTED CL |
|---|---|---|
| MAXIMUM COMMUNICATION SPEED | RADIO WAVE INTENSITY | MAXIMUM COMMUNICATION SPEED |
| 300Mbps | -60dBm | 54Mbps |

Fig. 9

<AP SCORE TABLE>

| AP IDENTIFICATION INFORMATION | INFORMATION ON CONNECTION REQUEST CL | | | INFORMATION ON CONNECTED CL | | SCORE |
|---|---|---|---|---|---|---|
| | PROBE REQUEST | MAXIMUM COMMUNICATION SPEED | RADIO WAVE INTENSITY | CONNECTED CL | MAXIMUM COMMUNICATION SPEED | |
| AP10a | YES | 300Mbps | -60dBm | YES | 54Mbps | 20 |
| AP10b | YES | 300Mbps | -55dBm | YES | 300Mbps | 25 |
| AP10c | YES | 300Mbps | -75dBm | YES | 300Mbps | 15 |
| AP10d | NO | — | — | NO | — | 0 |
| AP10e | NO | — | — | YES | 300Mbps | 0 |

Fig. 10

<SCORE CALCULATION POLICY>

| CONDITION | SCORE |
|---|---|
| WHEN PROBE REQUEST HAS BEEN RECEIVED FROM CONNECTION REQUEST CL | 10 |
| WHEN PROBE REQUEST HAS NOT BEEN RECEIVED FROM CONNECTION REQUEST CL | 0 |
| WHEN THERE IS NO CONNECTED CL | 10 |
| WHEN MAXIMUM COMMUNICATION SPEED OF CONNECTION REQUEST CL IS SAME AS MAXIMUM COMMUNICATION SPEED OF CONNECTED CL | 5 |
| WHEN MAXIMUM COMMUNICATION SPEED OF CONNECTION REQUEST CL IS DIFFERENT FROM MAXIMUM COMMUNICATION SPEED OF CONNECTED CL | 0 |
| WHEN RADIO WAVE INTENSITY OF CONNECTION REQUEST CL IS EQUAL TO OR LARGER THAN -60 dBm | 10 |
| WHEN RADIO WAVE INTENSITY OF CONNECTION REQUEST CL IS SMALLER THAN -60 dBm | 0 |

Fig. 11

COMMUNICATION APPARATUS, ACCESS POINT MANAGEMENT APPARATUS, SELECTIVE COMMUNICATION CONNECTION METHOD, AND NON-TRANSITORY COMPUTER READABLE MEDIUM

CROSS REFERENCE TO RELATED APPLICATIONS

This application is a National Stage of International Application No. PCT/JP2019/034770 filed Sep. 4, 2019, claiming priority based on Japanese Patent Application No. 2018-173806 filed Sep. 18, 2018, the disclosure of which is incorporated herein in its entirety by reference.

TECHNICAL FIELD

The present disclosure relates to a communication apparatus, an access point management apparatus, a selective communication connection method, and a selective communication connection program, and more particularly, to a communication apparatus, an access point management apparatus, a selective communication connection method, and a selective communication connection program for selectively establishing a radio communication connection with a client.

BACKGROUND ART

In recent years, with the spread in use of a communication apparatus that functions as an access point in a wireless Local Area Network (LAN), a wireless LAN system including a plurality of access points has been used in various places such as offices and public facilities. Various techniques for selecting an optimal access point for a client to connect in this wireless LAN system have been proposed.

For example, in the wireless LAN system disclosed in Patent Literature 1, a cost is calculated based on a radio wave intensity of a wireless LAN client received by an access point and the number of wireless LAN clients already connected to the access point, and an access point whose cost is the smallest is selected as the optimal access point.

CITATION LIST

Patent Literature

[Patent Literature 1] Japanese Patent No. 6233901

SUMMARY OF INVENTION

Technical Problem

However, when there are both a wireless LAN client for high-speed communication and a wireless LAN client for low-speed communication in the wireless LAN system disclosed in Patent Literature 1, it is possible that these wireless LAN clients may connect to one access point. In this case, while the wireless LAN client for low-speed communication is performing data communication with an access point, the wireless LAN client for high-speed communication needs to wait, which may cause a round-trip time between the wireless LAN client for high-speed communication and the access point to increase.

The present disclosure has been made in view of the aforementioned problem and aims to provide a communication apparatus, an access point management apparatus, a selective communication connection method, and a selective communication connection program capable of reducing a round-trip time between the client and the access point in a communication system including a plurality of access points.

Solution to Problem

A communication apparatus according to the present disclosure functions as an access point, and includes: an information sharing unit configured to transmit/receive, when a radio communication connection has been requested from a first client, information to be shared with another access point; score calculation unit configured to calculate, for the access point and the other access point, scores indicating their priority as a destination to which the first client is connected using the information to be shared; a connection necessity determination unit configured to determine whether or not it is necessary to establish a radio communication connection with the first client based on the scores calculated by the score calculation unit; and a connection processing unit configured to establish a radio communication connection with the first client when the connection necessity determination unit has determined that it is necessary to establish the radio communication connection. The information to be shared includes information indicating the presence or the absence of a second client that has already established the radio communication connection with an access point. The score calculation unit calculates a score for giving a high-order priority to an access point in which the radio communication connection with the second client has not been established based on the information indicating the presence or the absence of the second client. The connection necessity determination unit determines that it is necessary to establish the radio communication connection with the first client when the score of the access point is the highest among the scores calculated by the score calculation unit.

Advantageous Effects of Invention

According to the present disclosure, it is possible to provide a communication apparatus, an access point management apparatus, a selective communication connection method, and a selective communication connection program capable of reducing a round-trip time between the client and the access point in a communication system including a plurality of access points.

BRIEF DESCRIPTION OF DRAWINGS

FIG. 9 is a diagram showing one example of a client information table;

FIG. 10 is a diagram showing one example of an access point score table;

FIG. 11 is a diagram showing one example of a score calculation policy;

DESCRIPTION OF EMBODIMENTS

First Example Embodiment

Figure 1:
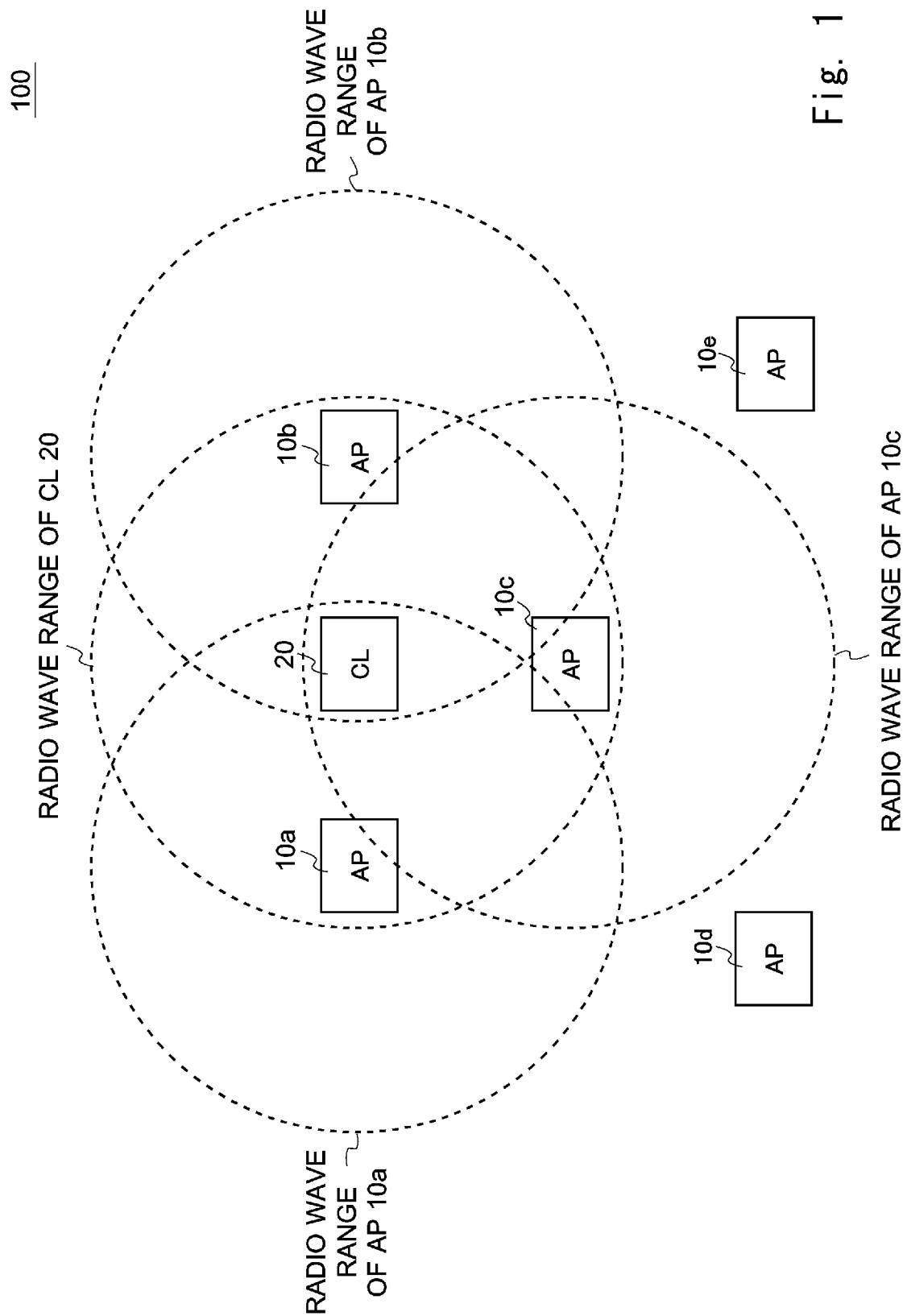
FIG. 1 is a schematic view showing one example embodiment of a communication system according to the present disclosure.

Hereinafter, with reference to the drawings, a first example embodiment of the present disclosure will be described. FIG. 1 is a schematic view showing one example embodiment of a communication system 100 according to the present disclosure. The communication system 100 includes communication apparatuses 10a-10e that function as access points (each of them will be represented by AP in the drawings described below), and a client (it will be represented by CL in the drawings described below) 20. Each of the communication apparatuses 10a-10e is connected to a wired LAN (not shown) and data communication between the communication apparatuses 10a-10e is mainly performed by the wired LAN. On the other hand, data communication between the communication apparatuses 10a-10e and the client 20 is performed mainly via a wireless LAN.

The communication apparatuses 10a-10e are apparatuses that are connected to a modem (not shown) connected to a telephone line or an optical network unit (not shown) connected to an optical line and perform data communication between various types of data servers (not shown) and the client 20 via the Internet or a network such as a Wide Area Network (WAN). A communication apparatus such as a wireless LAN router is assumed as an example of the communication apparatuses 10a-10e.

The client 20 is a communication apparatus such as a smart phone, a PC, a tablet terminal, a home electric appliance, or a sensor capable of performing data communication via radio waves. The client 20 broadcasts a probe request for requesting communication connection via the wireless LAN and establishes radio communication connection with an access point that has transmitted a probe response in response to the probe request. The probe request includes information indicating a maximum communication speed of the client 20.

Figure 2:
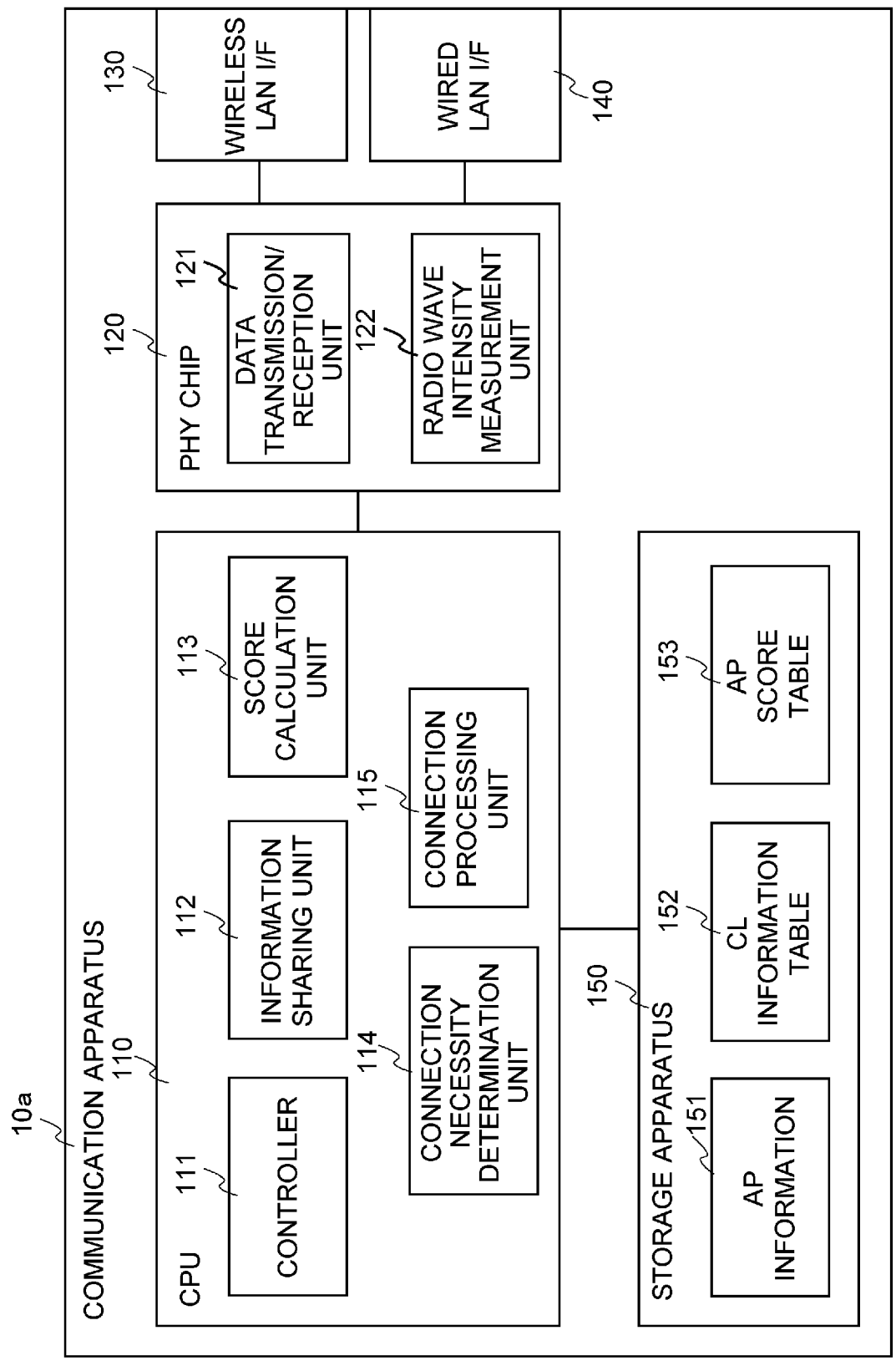
FIG. 2 is a block diagram showing a detailed configuration of a communication apparatus according to a first example embodiment of the present disclosure.

FIG. 2 is a block diagram showing a detailed configuration of the communication apparatus 10a according to the first example embodiment of the present disclosure. Hereinafter, the configuration of the communication apparatus 10a will be described. The communication apparatuses 10b-10e also have configurations similar to that of the communication apparatus 10a.

The communication apparatus 10a includes a Central Processing Unit (CPU) 110, a PHY chip 120, a wireless LAN interface 130, a wired LAN interface 140, and a storage apparatus 150. The CPU 110, the PHY chip 120, the wireless LAN interface 130, the wired LAN interface 140, and the storage apparatus 150 are connected by a wire made of copper or the like.

The CPU 110 is an arithmetic apparatus that executes various kinds of programs. The CPU 110 extends a selective communication connection program according to the present disclosure stored in a Read Only Memory (ROM) to a Random Access Memory (RAM) and executes the above program, thereby achieving a selective communication connection method according to the present disclosure. The selective communication connection program includes a controller 111, an information sharing unit 112, a score calculation unit 113, a connection necessity determination unit 114, and a connection processing unit 115, which are program modules.

The controller 111 plays a main role of achieving the function of the communication apparatus 10a and executes various types of processing by controlling other program modules or function units. The controller 111 acquires, when the communication apparatus 10a has received a probe request from the client 20, the radio wave intensity of the client 20 from a radio wave intensity measurement unit 122 of the PHY chip 120 and the maximum communication speed of the client 20 included in the probe request. The controller 111 registers the radio wave intensity and the maximum communication speed of the client 20 in a client information table 152 as shown in FIG. 9.

FIG. 9 is a diagram showing one example of the client information table 152. The client information table 152 registers the maximum communication speed and the radio wave intensity of the connection request client who has requested the radio communication connection and the maximum communication speed of the connected client who has already established the radio communication connection with an access point. While the maximum communication speed of one connected client is registered in the client information table shown in FIG. 9, when a plurality of clients have established the radio communication connection with the communication apparatus 10a, maximum communication speeds of a plurality of connected clients are registered.

Further, when the communication apparatus 10a has received the probe request from the client 20, the controller 111 registers, in an access point score table 153 as shown in FIG. 10, the information on the connection request client and the information on the connected client in association with the identification information of the communication apparatus 10a.

FIG. 10 is a diagram showing one example of the access point score table 153. In the access point score table 153, the information on the connection request client and the information and the score of the connected client are registered in association with the access point identification information. The information on the connection request client includes information indicating whether or not the access point identified by the access point identification information has received a probe request from the connection request client, and the maximum communication speed and the radio wave intensity of the connection request client. The information on the connected client includes information indicating whether or not the access point identified by the access point identification information includes a connected client and the maximum communication speed of the connected client.

The information sharing unit 112 is a program module that transmits/receives and shares the information to be shared, which is information that should be shared among the plurality of access points included in the communication system 100. The information to be shared includes (1) information indicating whether or not the probe request from the connection request client has been received, (2) information indicating the presence or the absence of the connected client, (3) the maximum communication speed of the connection request client and the maximum communication speed of the connected client, and (4) the intensity of the radio waves of the connection request client received by the access point.

When the communication apparatus 10a has received a probe request from the client 20, the information sharing unit 112 refers to the access point score table 153, acquires the information to be shared associated with the identification information of the communication apparatus 10a, and transmits this information to be shared to another access point. The information sharing unit 112 registers, upon receiving the information to be shared from the other access point, this information to be shared in the access point score table 153 in association with the specific identification information of the other access point.

Further, the information sharing unit 112 broadcasts the information sharing request to the other access points. The information sharing request is a request for causing the access point that has not received the probe request to provide the information to be shared for the other access points. When the communication apparatus 10a has received the information sharing request from another access point, the information sharing unit 112 transmits information on the connected client to the other access points as the information to be shared only when the communication apparatus 10a has not received the probe request from the client 20.

The score calculation unit 113 is a program module that calculates, for each of the access points included in the communication system 100, a score, which is a value indicating the priority as the destination to which the connection request client is connected using the information registered in the access point score table 153 in accordance with the score calculation policy as shown in FIG. 11. Specifically, the score calculation unit 113 sets, when the access point whose score is to be calculated has received a probe request from the connection request client, a value indicating a high-order priority (e.g., "10") as a temporary value of the score of this access point. On the other hand, when the access point whose score is to be calculated has not received a probe request from the connection request client, the score calculation unit 113 uses a value indicating a low-order priority (e.g., "0") as the score of this access point. In place of the value indicating the low-order priority, information indicating that the probe request has not been received (e.g., NULL) may be used as the score of this access point.

Further, the score calculation unit 113 determines whether or not there is a connected client in the access point that has received the probe request based on the information indicating the presence or the absence of the connected client, and when there is no connected client, the score calculation unit 113 adds the value indicating the high-order priority (e.g., "10") to the score of this access point. On the other hand, when there is a connected client in the access point that has received the probe request, the score calculation unit 113 compares the maximum communication speed of the connection request client with the maximum communication speed of the connected client, and adds, when the maximum communication speeds of these clients are the same, the value indicating an intermediate priority (e.g., "5") to the score of this access point. On the other hand, when the maximum communication speeds of these clients are different from each other, the score calculation unit 113 does not add any value to the score of this access point.

Further, the score calculation unit 113 compares the radio wave intensity of the probe request that the access point has received from the connection request client with a threshold (e.g., "−60 dBm") and adds, when the radio wave intensity of the connection request client is equal to or larger than the threshold, the value indicating the high-order priority (e.g., "10") to the score of this access point. This threshold may be such a radio wave intensity that allows the client 20 to achieve its maximum communication speed (theoretical value) in the data communication with the communication apparatus 10a. On the other hand, when the radio wave intensity of the connection request client is smaller than the threshold, the score calculation unit 113 does not add any value to the score of this access point. The score calculation unit 113 registers the score of the access point thus calculated in the access point score table 153.

The connection necessity determination unit 114 is a program module that determines whether or not it is necessary to establish the radio communication connection with the connection request client based on the scores calculated by the score calculation unit 113. Specifically, the connection necessity determination unit 114 determines, when the score of the communication apparatus 10a is the highest among the scores calculated by the score calculation unit 113, that it is necessary to establish the radio communication connection with the connection request client. When there is another access point that has a score that is the same as the score of the communication apparatus 10a, the connection necessity determination unit 114 determines, when the radio wave intensity of the probe request of the connection request client received by the communication apparatus 10a is higher than the radio wave intensity of the probe request of the connection request client received by the other access point having the same score, that it is necessary to establish the radio communication connection with the connection request client.

The connection processing unit 115 is a program module that executes connection processing for establishing the radio communication connection with the connection request client. The connection processing unit 115 executes, when the connection necessity determination unit 114 has determined that it is necessary to establish the radio communication connection with the connection request client, connection processing for establishing the radio communication connection with the connection request client.

The PHY chip 120 is a semiconductor integrated circuit that executes processing of a physical layer, which is a first layer of an OSI reference model. The PHY chip 120, which is arranged between the CPU 110, and the wireless LAN interface 130 and the wired LAN interface 140, performs processing such as serialization or parallelization of data, D/A conversion, A/D conversion, and amplification of electric signals. Further, the PHY chip 120 includes a data transmission/reception unit 121 and a radio wave intensity measurement unit 122.

The data transmission/reception unit 121 is a logic circuit that transmits/receives data communicated with the client 20 or an external apparatus such as a modem. The data transmission/reception unit 121 forwards data received from the wireless LAN interface 130 and the wired LAN interface 140 to the CPU 110 and forwards data received from the CPU 110 to the wireless LAN interface 130 and the wired LAN interface 140.

The radio wave intensity measurement unit 122 is a logic circuit that measures the intensity of the radio wave signal received from the client 20 (RSSI: Received Signal Strength Indicator). The radio wave intensity measurement unit 122 measures, upon receiving the probe request from the client 20, the intensity of the radio wave signal that forms the probe request. The radio wave intensity measurement unit 122 provides the results of measuring the intensity of the radio wave signal for the controller 111 in accordance with the request from the controller 111.

The wireless LAN interface 130 transmits an analog signal received from the PHY chip 120 to the client 20 or an external apparatus via the wireless LAN and supplies the analog signal received from the client 20 or an external apparatus to the PHY chip 120.

The wired LAN interface 140 transmits the analog signal received from the PHY chip 120 to another access point or an external apparatus via a wired LAN and supplies the analog signal received from another access point or an external apparatus to the PHY chip 120.

The storage apparatus 150, which is a storage apparatus storing various kinds of data or programs, or a data table, can be composed of a ROM or a RAM. In the storage apparatus 150, access point information 151 is stored, and the aforementioned client information table 152 and access point score table 153 are constructed. The access point information 151, which is identification information of the access points 10a-10e included in the communication system 100, is registered in the access point score table 153 as shown in FIG. 10 in advance. A MAC address or the like of the access point can be used as the identification information of the access point.

Figure 3:
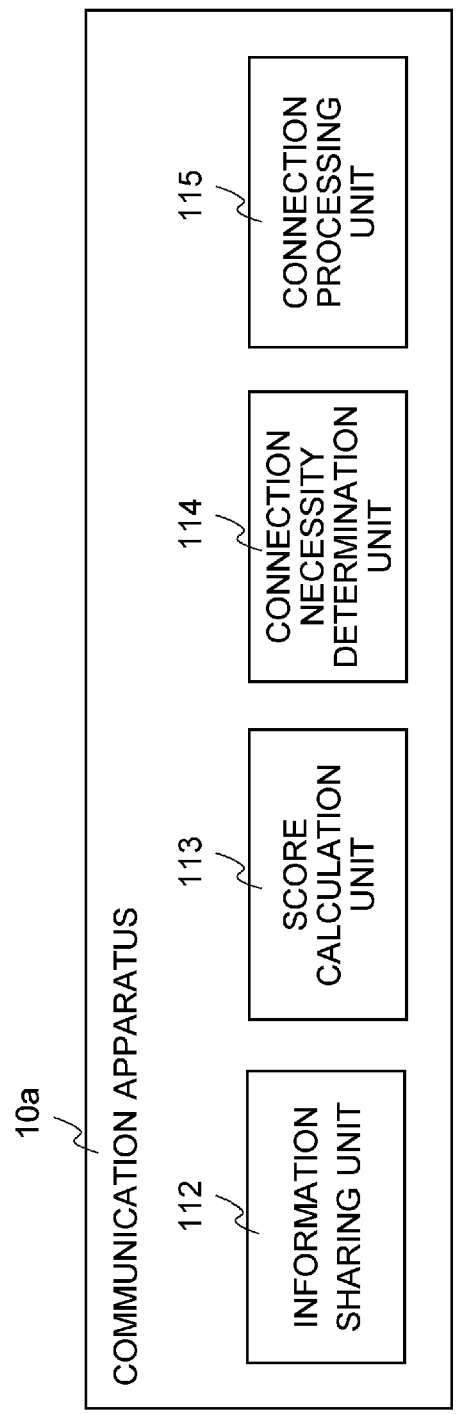
FIG. 3 is a block diagram showing a schematic configuration of the communication apparatus according to the first example embodiment of the present disclosure.

FIG. 3 is a block diagram showing main program modules included in the communication apparatus 10a according to the first example embodiment. The communication apparatus 10a includes, as main program modules, the information sharing unit 112, the score calculation unit 113, the connection necessity determination unit 114, and the connection processing unit 115 described above.

Figure 4:
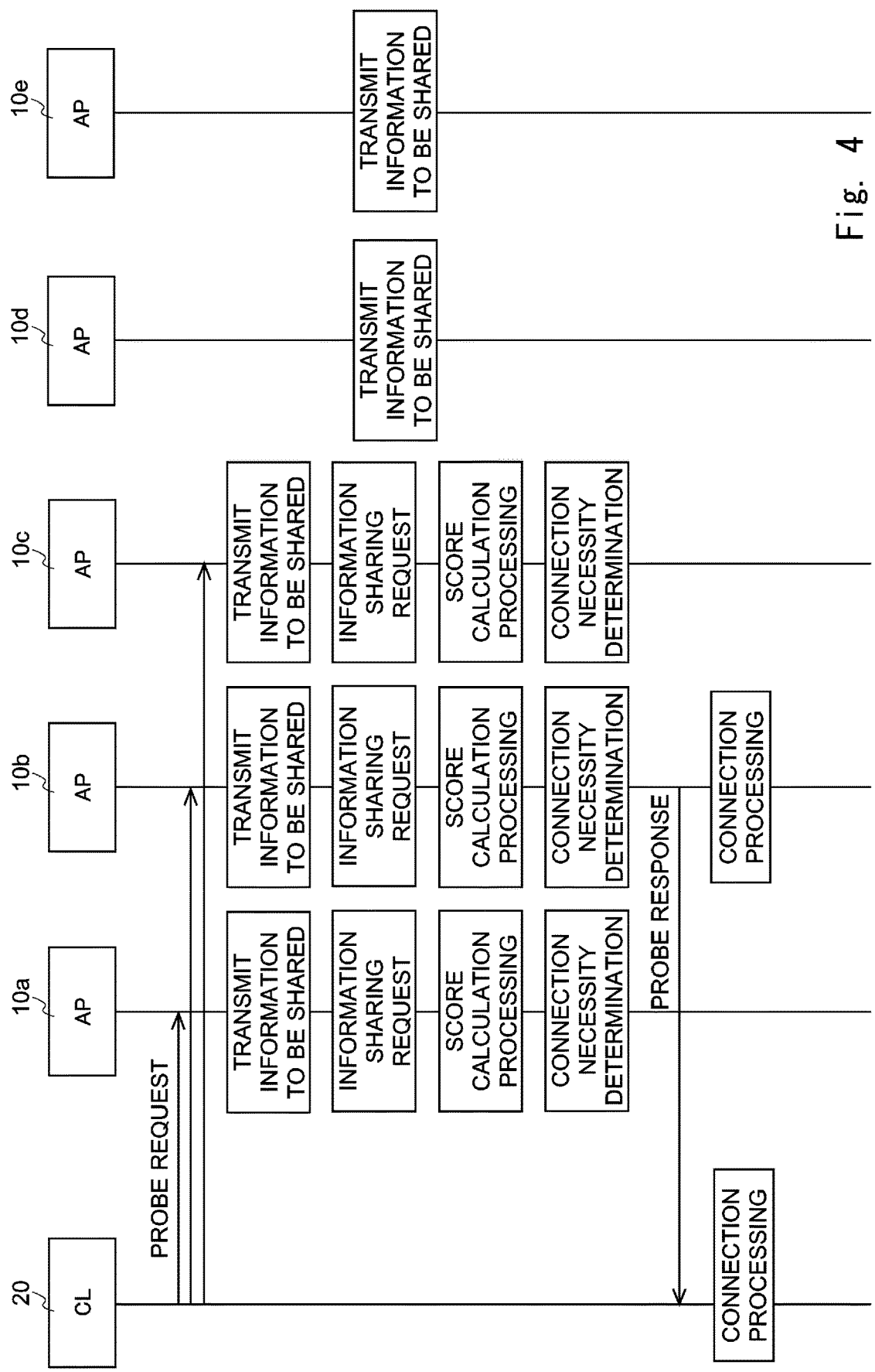
FIG. 4 is a sequence diagram showing one example of processing executed in a communication system according to the first example embodiment of the present disclosure.

FIG. 4 is a sequence diagram showing one example of processing executed in the communication system 100 according to the first example embodiment of the present disclosure. In the example shown in FIG. 4, as shown in FIG. 1, it is assumed that the access points 10a, 10b, and 10c are arranged within the radio wave range of the client 20 and that the client 20 is arranged within the radio wave range of the access points 10a, 10b, and 10c. Hereinafter, with reference to FIG. 4, the sequence of the processing executed when the client 20 establishes the radio communication connection with the access point 10b will be described.

When the client 20 establishes the radio communication connection with one of the access points 10a-10e included in the communication system 100, the client 20 broadcasts the probe request via the wireless LAN. The access points 10a, 10b, and 10c that have received the probe request from the client 20 transmit the information to be shared to other access points via the wired LAN and broadcasts the information sharing request. The access points 10d and 10e that have not received the probe request from the client 20 each transmit, upon receiving the information sharing request from another access point, the information to be shared to access points other than these access points 10d and 10e.

Next, each of the access points 10a, 10b, and 10c that have received the probe request executes score calculation processing, calculates the scores for the access points 10a-10e included in the communication system 100, and determines whether it needs to establish the radio communication connection with the client 20. Only the access point 10b determined that it is necessary to establish the radio communication connection with the client 20 sends back the probe response to the client 20, executes connection processing, and establishes the radio communication connection with the client 20.

Figure 5:
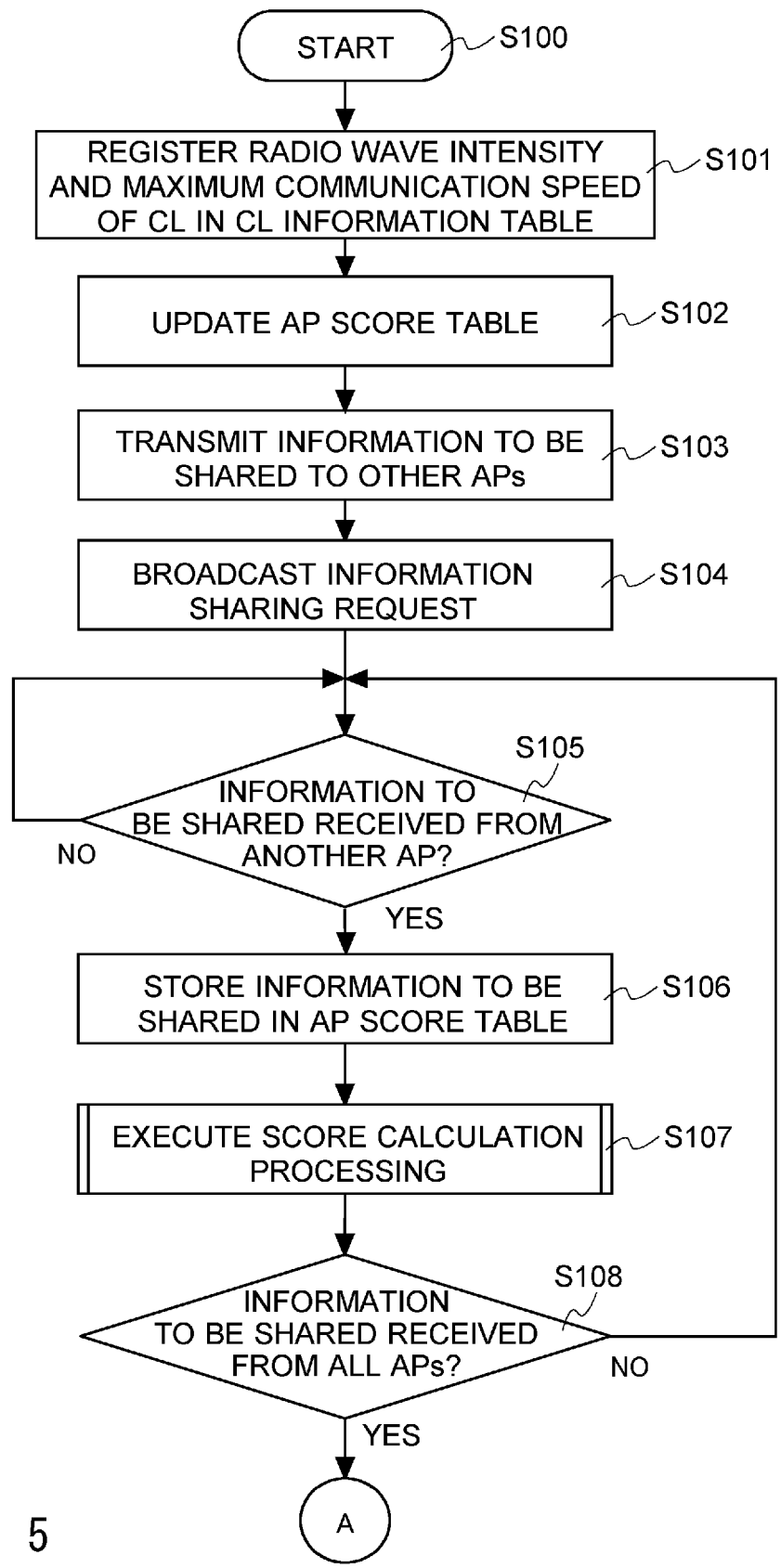
FIG. 5 is a flowchart showing processing executed by the communication apparatus according to the first example embodiment of the present disclosure.
Figure 6:
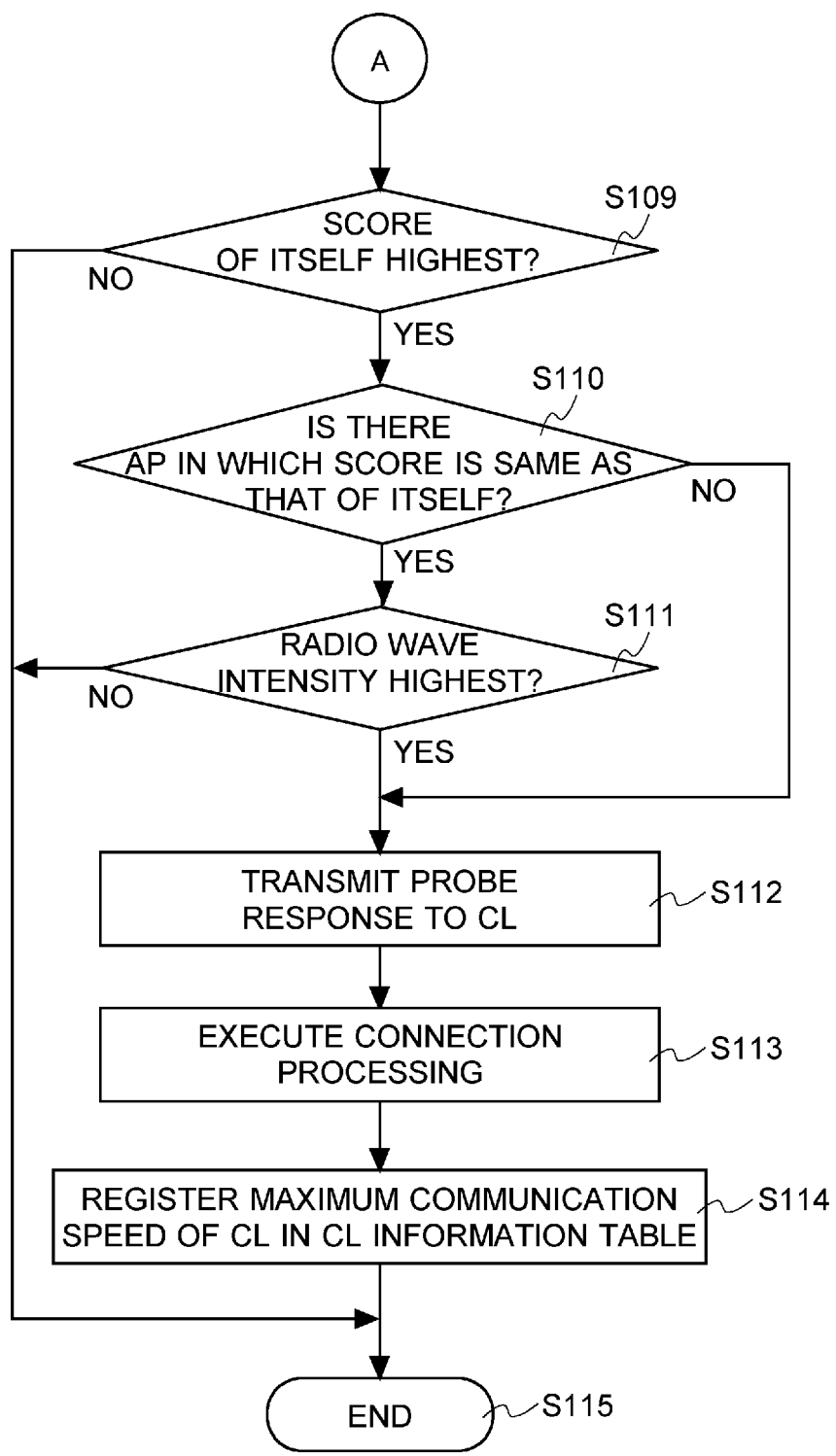
FIG. 6 is a flowchart showing processing executed by the communication apparatus according to the first example embodiment of the present disclosure.

FIGS. 5 and 6 are flowcharts showing processing executed by the communication apparatus according to the first example embodiment of the present disclosure. In the following, a case in which the access point 10a has received the probe request from the client 20 will be described.

The processing shown in FIG. 5 starts from Step S100. In Step S101, the controller 111 of the access point 10a acquires, from the radio wave intensity measurement unit 122, the radio wave intensity of the connection request client 20 that has transmitted the probe request and acquires the maximum communication speed of the connection request client 20 included in the probe request, and registers the acquired information in the client information table 152.

In Step S102, the controller 111 registers, in the access point score table 153, the information indicating that it has received the probe request from the connection request client 20, the radio wave intensity of the connection request client 20, and the maximum communication speed of the connection request client 20 in association with the identification information of the access point 10a. The controller 111 registers, when the maximum communication speed of the connected client is registered in the client information table 152, besides the information on the connection request client, the information indicating that there is a connected client, and the maximum communication speed of the connected client in the access point score table 153 in association with the identification information of the access point 10a. On the other hand, when the maximum communication speed of the connected client has not been registered in the client information table 152, the controller 111 registers, besides the information on the connection request client, information indicating that there is no connected client in association with the identification information of the access point 10a in the access point score table 153.

In Step S103, the information sharing unit 112 refers to the access point information 151 stored in the storage apparatus 150 and specifies the other access points to which the information to be shared should be transmitted, that is, access points other than the access point 10a, and transmits the information to be shared to these access points. The information sharing unit 112 transmits, when the information indicating that there is a connected client has been registered in the access point information 151, information indicating that the probe request has been received, the maximum communication speed and the radio wave intensity of the connection request client 20, information indicating that there is a connected client, and the maximum communication speed of the connected client to the other access points as the information to be shared. On the other hand, when the information indicating that there is no connected client is registered in the access point information 151, the information sharing unit 112 transmits the information indicating that the probe request has been received, the maximum communication speed and the radio wave intensity of the connection request client 20, and the information indicating that there is no connected client to the other access points as the information to be shared.

In Step S104, the information sharing unit 112 broadcasts the information sharing request to the other access points 10b to 10e. In Step S105, the information sharing unit 112 determines whether or not the information to be shared has been received from another access point. When the information to be shared has not been received from another access point (NO), the information sharing unit 112 executes Step S105 again. On the other hand, when the information to be shared has been received from another access point (YES), the process proceeds to Step S106.

In Step S106, the information sharing unit 112 registers the information to be shared received from the other access point in the access point score table 153. The information sharing unit 112 registers, when the information indicating that the probe request has been received from another access point has been received, the information indicating that the probe request has been received, the maximum communication speed and the radio wave intensity of the connection request client in association with the identification information of the other access point in the access point score table 153. On the other hand, when the information indicating that the probe request has not been received has been received from another access point, the information sharing unit 112 registers, in the access point score table 153, the information indicating that the probe request has not been received in association with the identification information of the other access point. Further, the information sharing unit 112 registers, when information indicating that there is a connected client has been received from another access point, information indicating that there is a connected client and the maximum communication speed of the connected client in association with the identification information of the other access point in the access point score table 153. On the other hand, when the information indicating that there is no connected client has been received from the other access point, the information sharing unit 112 registers, in the access point score table 153, the information indicating that there is no connected client in association with the identification information of the other access point.

Figure 8:
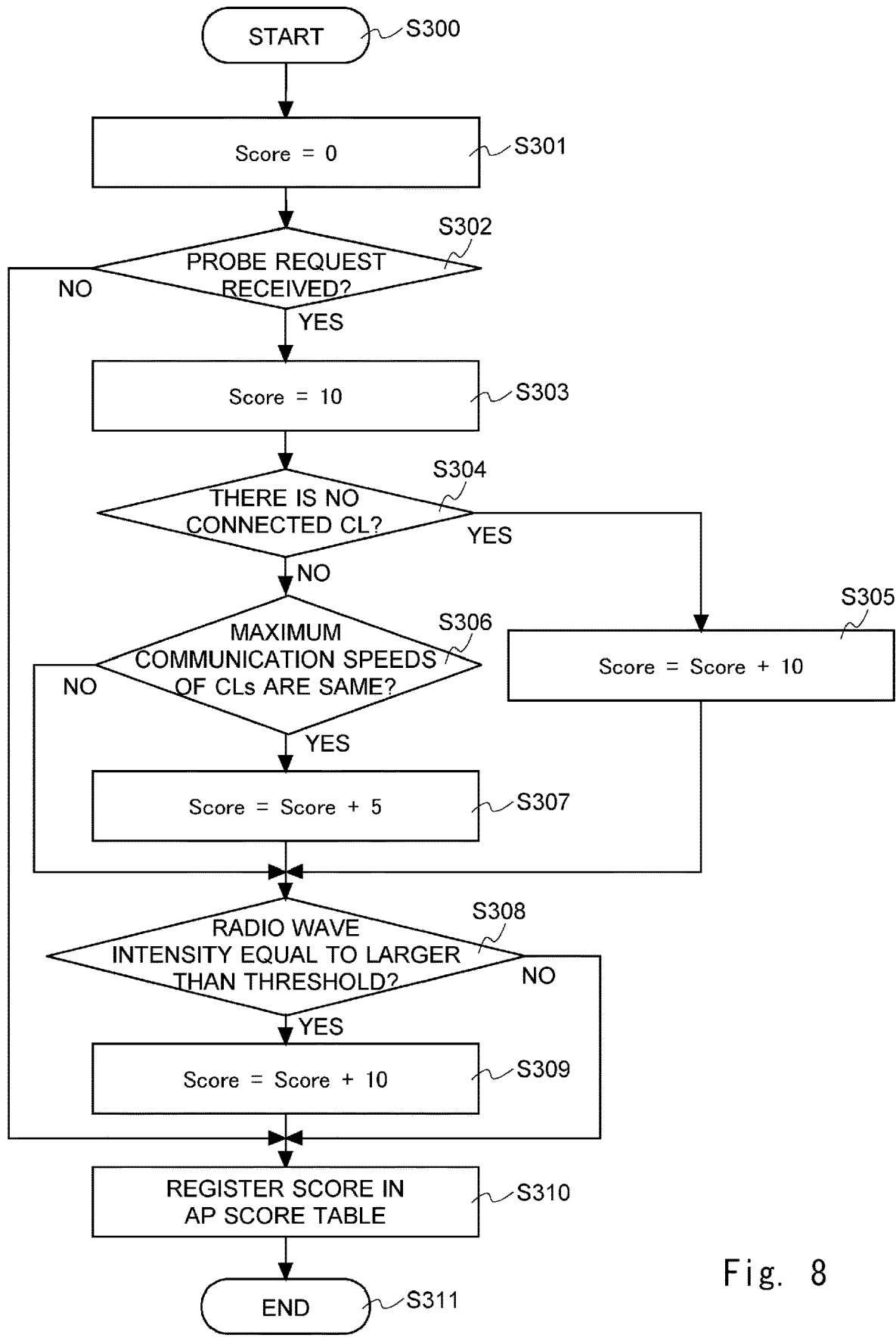
FIG. 8 is a flowchart showing one example embodiment of score calculation processing.

In Step S107, the score calculation unit 113 executes, for the other access points, the score calculation processing shown in FIG. 8, and calculates the scores of the other access points. In Step S108, the information sharing unit 112 refers to the access point score table 153 and determines whether the information to be shared has been received from all the access points. The information sharing unit 112 determines whether or not the scores have been calculated for all the access points identified by the access point identification information registered in the access point score table 153, whereby it is possible to determine whether the information to be shared has been received from all the access points.

When the information to be shared has not been received from all the access points (NO), the process goes back to Step S105. On the other hand, when the information to be shared has been received from all the access points (YES), the process proceeds to Step S109 shown in FIG. 6. In Step S109, the connection necessity determination unit 114 refers to the access point score table 153, compares the score of the access point 10a with the scores of the other access points, and determines whether or not the score of the access point 10a is the highest. When the score of the access point 10a is not the highest score (NO), the process ends with Step S115. On the other hand, when the score of the access point 10a is the highest score (YES), the process proceeds to Step S110.

In Step S110, the connection necessity determination unit 114 refers to the access point score table 153, compares the score of the access point 10a with the scores of the other access points, and determines whether or not there is an access point in which a score is the same as that of the access point 10a. When there is no access point in which the score is the same as the score of the access point 10a (NO), the process proceeds to Step S112. On the other hand, when there is an access point in which the score is the same as the score of the access point 10a (YES), the process proceeds to Step S111. In Step S111, the connection necessity determination unit 114 refers to the access point score table 153, compares the radio wave intensity of the connection request client 20 associated with the identification information of the access point 10a (that is, the radio wave intensity of the connection request client 20 that the access point 10a has received) with the radio wave intensity of the connection request client 20 associated with the identification information of the access point in which the score is the same as that of the access point 10a (that is, the radio wave intensity of the connection request client 20 received by the access point in which the score is the same), and determines whether or not the radio wave intensity of the connection request client 20 that the access point 10a has received is the highest. When the radio wave intensity of the connection request client 20 that the access point 10a has received is not the highest (NO), the process ends with Step S115. On the other hand, when the radio wave intensity of the connection request client 20 that the access point 10a has received is the highest (YES), the process proceeds to Step S112.

In Step S112, the connection processing unit 115 transmits a probe response to the client 20 who has transmitted the probe request. In Step S113, the connection processing unit 115 executes connection processing with the client 20. In Step S114, the connection processing unit 115 registers the information indicating the maximum communication speed of the client 20 included in the probe request in the client information table 152 as the maximum communication speed of the connected client and the processing is ended in Step S115.

Figure 7:
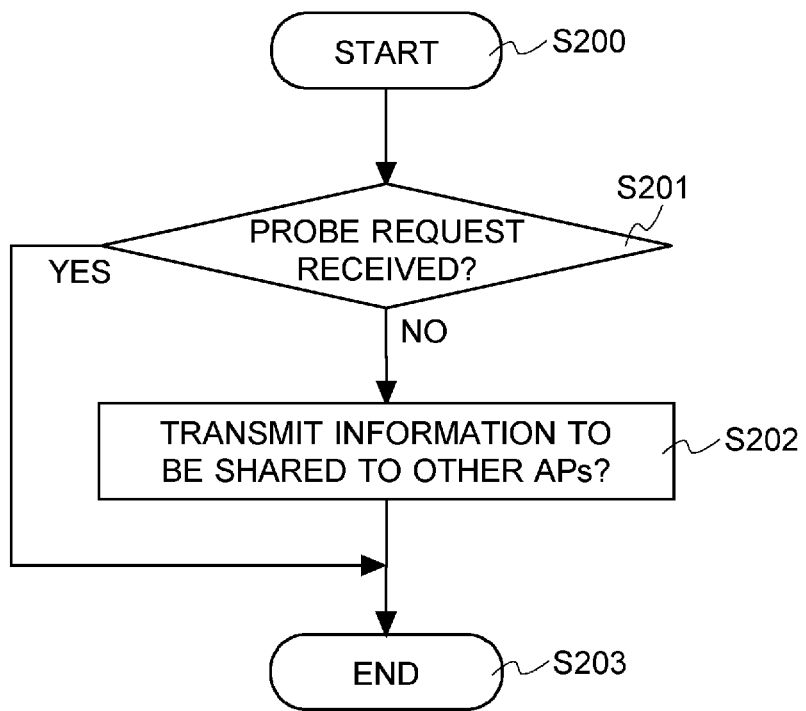
FIG. 7 is a flowchart showing processing executed by the communication apparatus according to the first example embodiment of the present disclosure.

FIG. 7 is a flowchart showing processing executed by the communication apparatus according to the first example embodiment of the present disclosure. The processing shown in FIG. 7 is processing for allowing the access point that has not received the probe request from the client 20, that is, the access point arranged in the outside of the radio wave range of the client 20 to provide the information to be shared of this access point for the other access points. Hereinafter, a case in which the access point 10d has received the information sharing request from another access point will be described.

The processing shown in FIG. 7 starts from Step S200. In Step S201, the information sharing unit 112 of the access point 10d refers to the access point score table 153 and determines whether or not the access point 10d has received the probe request. In this example embodiment, the initial value of the column in which information indicating the presence or the absence of the probe request in the access point score table 153 is registered is NULL. When the access point 10d has received the probe request, information indicating that the probe request has been received is registered in this column in Step S102 shown in FIG. 5. Therefore, the information sharing unit 112 is able to determine whether or not the access point 10*d* has received the probe request by referring to the information registered in the column.

When the access point 10*d* has received the probe request (YES), the processing is ended in Step S203. On the other hand, when the access point 10*d* has not received the probe request (NO), the process moves to Step S202. In Step S202, the information sharing unit 112 refers to the access point information 151 stored in the storage apparatus 150, specifies the other access points to which the information to be shared should be transmitted, that is, the access points 10*a* to 10*c* and 10*e* other than the access point 10*d*, transmits the information to be shared to these access points, and the processing is ended in Step S203. The information sharing unit 112 refers to the client information table 152, and when the maximum communication speed of the connected client has been registered, the information sharing unit 112 transmits the information indicating that the connected client is present, the maximum communication speed of the connected client, and the information indicating that the probe request has not been received to the other access points as the information to be shared. On the other hand, when the maximum communication speed of the connected client has not been registered in the client information table 152, the information sharing unit 112 transmits the information indicating that there is no connected client and the information indicating that the probe request has not been received to the other access points as the information to be shared.

FIG. 8 is a flowchart showing one example embodiment of the score calculation processing. FIG. 8 starts from Step S300, and in Step S301, the score calculation unit 113 initializes the variable Score by "0". In Step S302, the score calculation unit 113 refers to the access point score table 153 and determines whether or not the access point whose score is to be calculated has received the probe request. When the access point whose score is to be calculated has not received the probe request (NO), the process proceeds to Step S310. On the other hand, when the access point whose score is to be calculated has received the probe request (YES), the process proceeds to Step S303. In Step S303, the score calculation unit 113 sets "10" as the variable Score.

In Step S304, the score calculation unit 113 refers to the access point score table 153 and determines whether there is no connected client in the access point whose score is to be calculated. When there is no connected client in the access point whose score is to be calculated (YES), the process proceeds to Step S305. In Step S305, the score calculation unit 113 adds "10" to the value set in the variable Score and the process proceeds to Step S308. On the other hand, when there is a connected client in the access point whose score is to be calculated (NO), the process proceeds to Step S306.

In Step S306, the score calculation unit 113 refers to the access point score table 153, compares the maximum communication speed of the connection request client associated with the identification information of the access point whose score is to be calculated with the maximum communication speed of the connected client, and determines whether or not the maximum communication speeds of these clients are the same. When the maximum communication speeds of these clients are different from each other (NO), the process goes to Step S308. On the other hand, when the maximum communication speeds of these clients are the same (YES), the process proceeds to Step S307. In Step S307, the score calculation unit 113 adds "5" to a value set in the variable Score.

In Step S308, the score calculation unit 113 refers to the access point score table 153 and determines whether the radio wave intensity of the connection request client associated with the identification information of the access point whose score is to be calculated is equal to or larger than a threshold (e.g., "−60 dBm"). When the radio wave intensity of the connection request client is smaller than the threshold (NO), the process proceeds to Step S310. On the other hand, when the radio wave intensity of the connection request client is equal to or larger than the threshold (YES), the process proceeds to Step S309. In Step S309, the score calculation unit 113 adds the point "10" to the variable Score. In Step S310, the score calculation unit 113 registers the value set in the variable Score in the access point score table 153 as a score, and the process is ended in Step S311.

According to the first example embodiment, the following effects are obtained. That is, since the score calculation unit 113 gives a high-order priority to the access point that has not established the radio communication connection with another client, this access point preferentially establishes the radio communication connection with the connection request client. Accordingly, waiting time that is due to the data communication between this access point and another client does not occur, whereby it is possible to reduce the round-trip time between the newly connected client and this access point.

Further, the score calculation unit 113 compares, when there is a connected client in the access point whose score is to be calculated, the maximum communication speed of the connection request client with the maximum communication speed of the connected client, and gives, when the maximum communication speeds of these clients are the same, the intermediate priority to this access point. On the other hand, the score calculation unit 113 gives, when the maximum communication speeds of these clients are different from each other, the low-order priority to this access point. Accordingly, the access point that has established the radio communication connection with the connected client having the maximum communication speed that is the same as that of the connection request client preferentially establishes the radio communication connection with the connection request client. Therefore, the connection request client for high-speed communication is able to preferentially establish the radio communication connection with the access point that has established the radio communication connection with the connected client for high-speed communication, not with the access point that has established the radio communication connection with the connected client for low-speed communication. As a result, it is possible to reduce waiting time due to the data communication between the connected client and the access point (that is, waiting time of the newly connected client) and to reduce the waiting time that is due to the data communication between the newly connected client and this access point (that is, waiting time of the connected client). Therefore, even when there is a connected client in the access point to be connected, the round-trip time between the client and the access point can be reduced.

Further, the score calculation unit 113 gives a high-order priority to an access point regarding which an intensity of the radio waves of the connection request client is equal to or larger than the threshold and gives a low-order priority to an access point regarding which an intensity of the radio waves of the connection request client is smaller than the threshold. Accordingly, the access point regarding which the received radio wave intensity is high preferentially establishes the radio communication connection with the connection request client. Therefore, the access point and the client are able to perform data communication using radio waves having a high intensity, the execution speed in this data communication can be increased, and the round-trip time between the client and the access point can be reduced.

Further, the connection necessity determination unit 114 determines, when there is another access point that has a score that is the same as the score of its access point, that it is necessary to establish the radio communication connection with the connection request client when the intensity of the radio waves of the connection request client for its access point is higher than the intensity of the radio waves of the connection request client received by another access point. Accordingly, the access point having a high received radio wave intensity preferentially establishes the radio communication connection with the connection request client. Therefore, the access point and the client are able to perform data communication using radio waves having a high intensity, the execution speed in this data communication can be increased, and the round-trip time between the client and the access point can be reduced.

Second Example Embodiment

Figure 12:
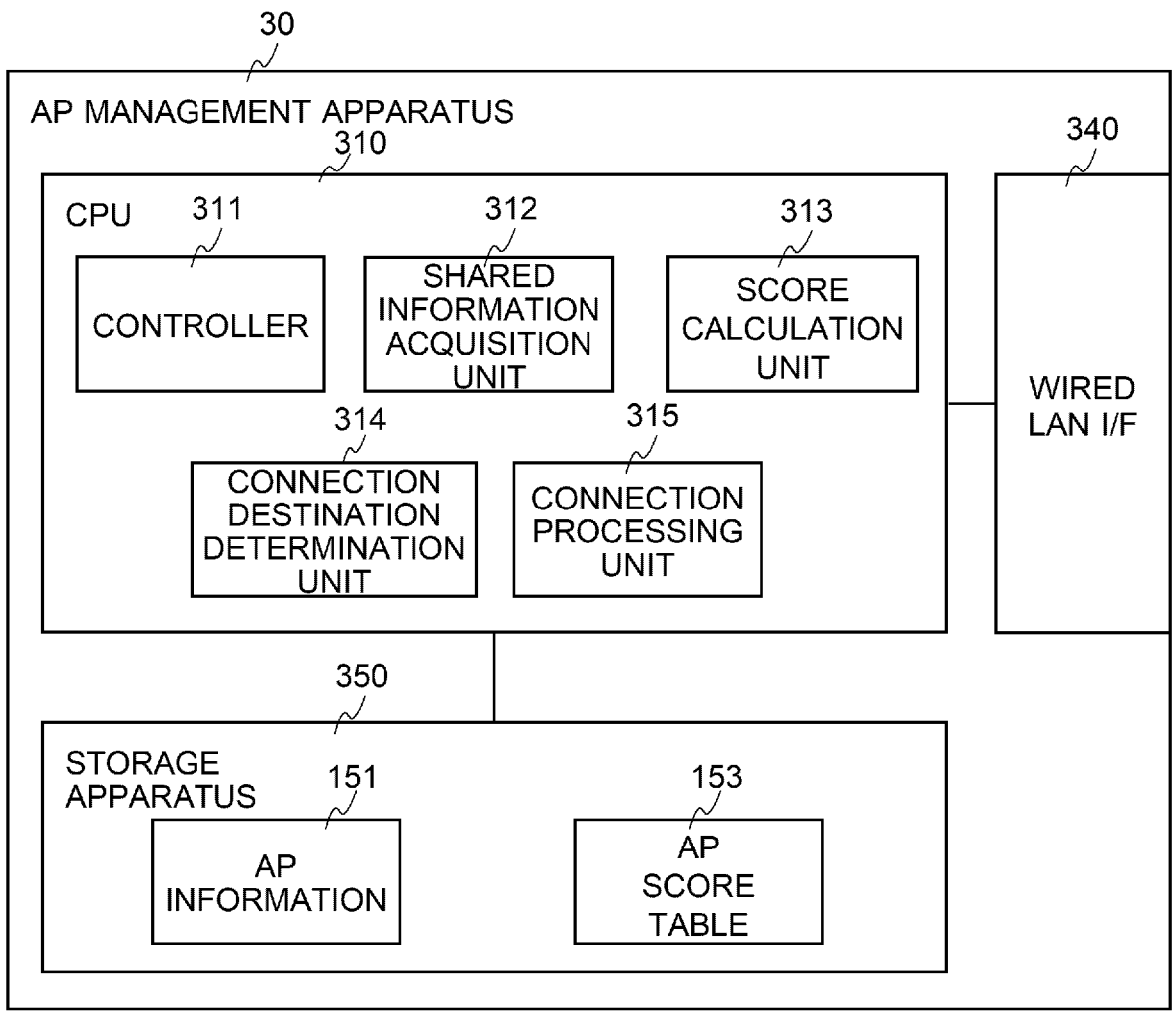
FIG. 12 is a block diagram showing a detailed configuration of a communication apparatus according to a second example embodiment of the present disclosure.

FIG. 12 is a block diagram showing a detailed configuration of an access point management apparatus 30 according to a second example embodiment of the present disclosure. In the second example embodiment, a communication system 100 includes communication apparatuses 10a-10e and the access point management apparatus 30, and the access point management apparatus 30 determines an access point that should be connected to a connection request client. In this example embodiment, the communication apparatuses 10a-10e may have a configuration that it does not include the score calculation unit 113, the connection necessity determination unit 114, and the access point score table 153.

The access point management apparatus 30, which is an information processing apparatus that can communicate with the communication apparatuses 10a-10e via a wired LAN network, determines the communication apparatus that should be connected to the connection request client and establishes the radio communication connection between the communication apparatus and the connection request client. The access point management apparatus 30 includes a CPU 310, a wired LAN interface 340, and a storage apparatus 350.

The CPU 310 is an arithmetic apparatus that executes various kinds of programs. The CPU 310 extends the selective communication connection program according to the present disclosure stored in a ROM to a RAM and executes this program, thereby achieving the selective communication connection method according to the present disclosure. The selective communication connection program includes a controller 311, a shared information acquisition unit 312, a score calculation unit 313, a connection destination determination unit 314, and a connection processing unit 315, which are program modules.

The controller 311 plays a main role of achieving the function of the access point management apparatus 30, and executes various types of processing by controlling other program modules or function units. The shared information acquisition unit 312 is a program module that acquires the information to be shared from an access point included in the communication system 100. The shared information acquisition unit 312 broadcasts, when a notification indicating that the access point has received the probe request from the connection request client (probe request notification) has been received, the information sharing request via the wired LAN and acquires the information to be shared from the access point.

The score calculation unit 313 is a program module that calculates the score for each access point included in the communication system 100 using the information registered in the access point score table 153, similar to the score calculation unit 113 according to the first example embodiment. The connection destination determination unit 314 is a program module that determines the access point that should establish the radio communication connection with the connection request client based on the scores calculated by the score calculation unit 313. The connection processing unit 315 is a program module for causing the connection destination determination unit 314 to establish the radio communication connection between the access point and the connection request client.

Figure 13:
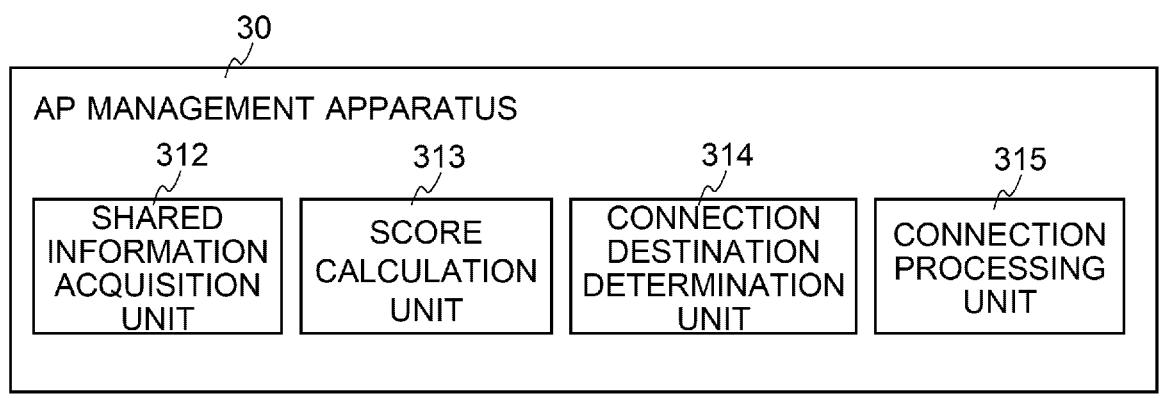
FIG. 13 is a block diagram showing a schematic configuration of a communication apparatus according to the second example embodiment of the present disclosure.

FIG. 13 is a block diagram showing main program modules included in the access point management apparatus 30 according to the second example embodiment. The access point management apparatus 30 includes, as main program modules, the shared information acquisition unit 312, the score calculation unit 313, the connection destination determination unit 314, and the connection processing unit 315 described above.

Figure 14:
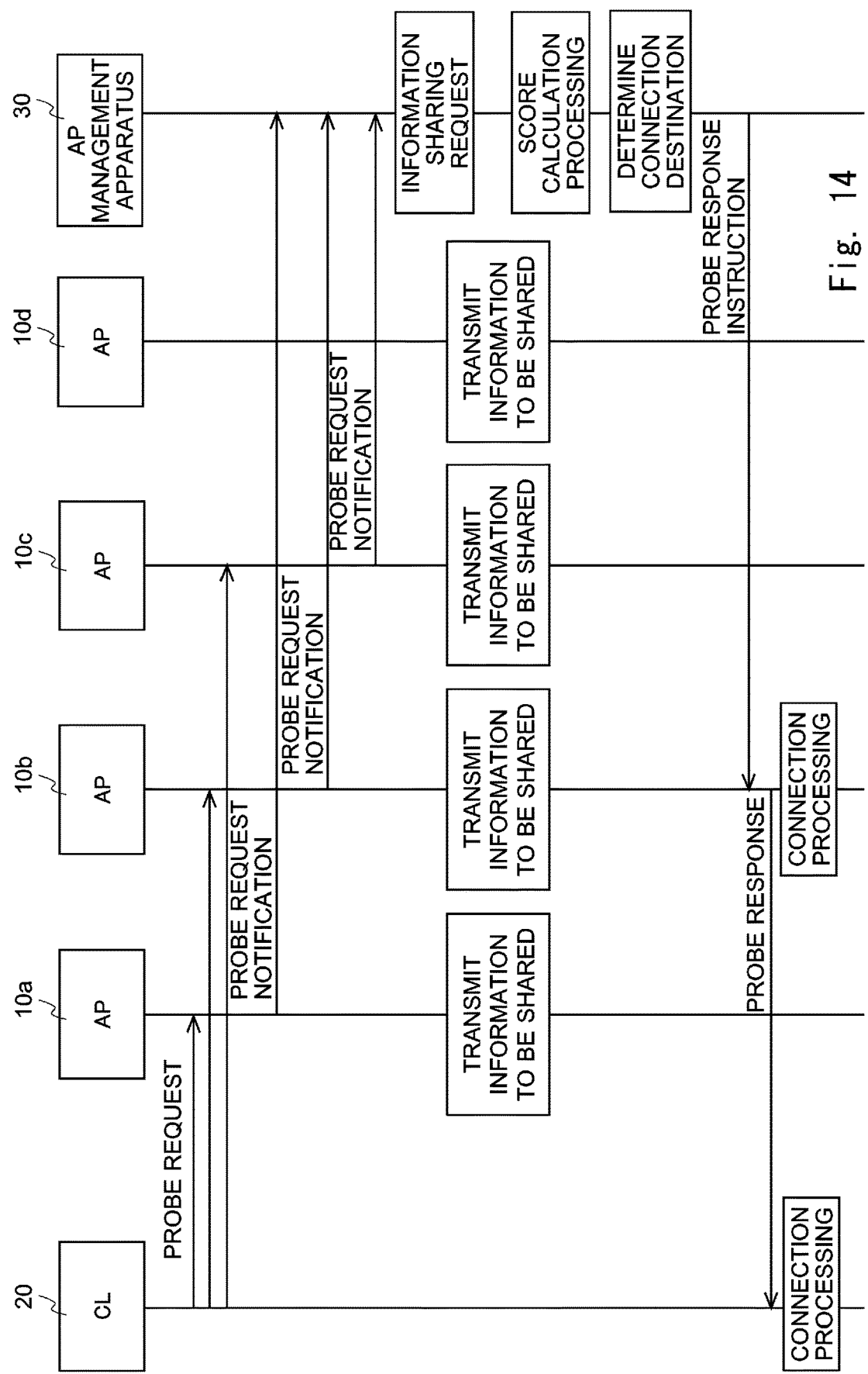
FIG. 14 is a sequence diagram showing one example of processing executed in a communication system according to the second example embodiment of the present disclosure.

FIG. 14 is a sequence diagram showing one example of processing executed in the communication system 100 according to the second example embodiment of the present disclosure. In the example shown in FIG. 14, it is assumed that the access points 10a, 10b, and 10c are arranged within the radio wave range of the client 20 and the client 20 is arranged within the radio wave range of the access points 10a, 10b, and 10c, like in FIG. 1 according to the first example embodiment. Hereinafter, with reference to FIG. 14, the sequence of the processing executed when the client 20 establishes the radio communication connection with the access point 10b will be described. While the access point 10e is not shown in FIG. 14, the behavior of the access point 10e is similar to that of the access point 10d.

When the client 20 establishes the radio communication connection with an access point included in the communication system 100, the client 20 broadcasts the probe request via the wireless LAN. The access points 10a, 10b, and 10c that have received the probe request from the client 20 each transmit a probe request notification to the access point management apparatus 30 via the wired LAN. Upon receiving the probe request notification from the access points, the access point management apparatus 30 refers to the access point information 151 and specifies all the access points included in the communication system 100, and transmits an information sharing request to these access points via the wired LAN.

The access points 10a-10e each transmit, upon receiving the information sharing request from the access point management apparatus 30, information to be shared of itself to the access point management apparatus 30. The access points 10a, 10b, and 10c that have received the probe request from the client 20 each transmit, along with the information indicating that it has received the probe request, the maximum communication speed and the radio wave intensity of the client 20 to the access point management apparatus 30. On the other hand, the access points 10d and 10e that have not received the probe request from the client 20 each transmit information indicating that it has not received the probe request to the access point management apparatus 30. Further, these access points each transmit, when there is a connected client, along with information indicating that there is a connected client, the maximum communication speed of the connected client to the access point management apparatus 30. On the other hand, when there is no connected client, the access point transmits information indicating that there is no connected client to the access point management apparatus 30.

The access point management apparatus 30 executes, upon receiving the information to be shared from the access points 10a-10e, the score calculation processing and calculates the scores for the access points included in the communication system 100. Then the access point management apparatus 30 determines the access point that should establish the radio communication connection with the client 20 based on the scores of the access points that have been calculated, and transmits a probe response instruction to the access point. When the access point 10b has received the probe response instruction from the access point management apparatus 30, the access point 10b sends back the probe response to the client 20 and establishes the radio communication connection with the client 20.

Figure 15:
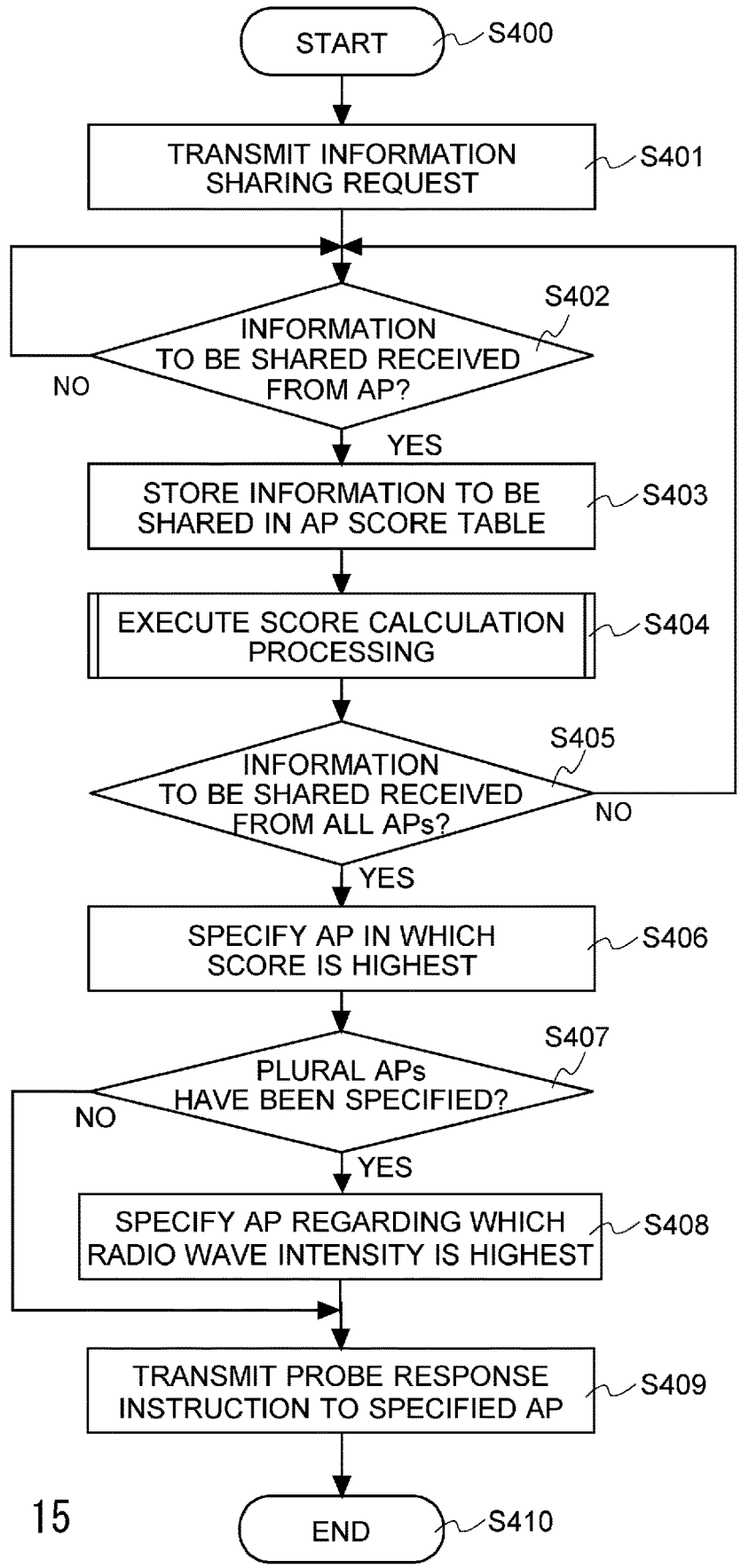
FIG. 15 is a flowchart showing processing executed by an access point management apparatus according to the second example embodiment of the present disclosure.

FIG. 15 is a flowchart showing processing executed by the access point management apparatus 30 according to the second example embodiment of the present disclosure. The processing shown in FIG. 15 starts from Step S400 when the access point management apparatus 30 has received the probe request notification from one of the communication apparatuses 10a-10e. Since it is possible that the access point management apparatus 30 may receive the probe request notification from a plurality of communication apparatuses substantially at the same time, when the access point management apparatus 30 has received the probe request notification from one communication apparatus and executed the processing shown in FIG. 15, the access point management apparatus 30 may be configured not to execute this processing for a certain period of time.

In Step S401, the shared information acquisition unit 312 of the access point management apparatus 30 transmits the information sharing request to the access point included in the communication system 100. In Step S402, the shared information acquisition unit 312 determines whether the information to be shared has been received from the access point. When the information to be shared has not been received from the access point (NO), the shared information acquisition unit 312 executes Step S402 again. On the other hand, when the information to be shared has been received from the access point (YES), the process proceeds to Step S403.

In Step S403, the shared information acquisition unit 312 registers the information to be shared received from the access point in the access point score table 153. Upon receiving the information indicating that the probe request has been received from the access point, the shared information acquisition unit 312 registers, in the access point score table 153, the information indicating that the probe request has been received, and the maximum communication speed and the radio wave intensity of the connection request client in association with the identification information of the access point. On the other hand, upon receiving the information indicating that the probe request has not been received from the access point, the shared information acquisition unit 312 registers, in the access point score table 153, the information indicating that the probe request has not been received in association with the identification information of the access point. Further, the shared information acquisition unit 312 registers, when the information indicating that there is a connected client has been received from the access point, the information indicating that there is a connected client and the maximum communication speed of the connected client in association with the identification information of the access point in the access point score table 153. On the other hand, when the information indicating that there is no connected client has been received from the access point, the shared information acquisition unit 312 registers, in the access point score table 153, the information indicating that there is no connected client in association with the identification information of the access point.

In Step S404, the score calculation unit 313 executes, for this access point, the score calculation processing shown in FIG. 8 and calculates the score of this access point. In Step S405, the shared information acquisition unit 312 refers to the access point score table 153 and determines whether the information to be shared has been received from all the access points. The shared information acquisition unit 312 determines whether or not the scores have been calculated for all the access points identified by the access point identification information registered in the access point score table 153, whereby it is possible to determine whether the information to be shared has been received from all the access points.

When the information to be shared has not been received from all the access points (NO), the process returns to Step S402. On the other hand, when the information to be shared has been received from all the access points (YES), the process proceeds to S406. In Step S406, the connection destination determination unit 314 refers to the access point score table 153 and specifies the access point in which the score is the highest. In Step S407, the connection destination determination unit 314 determines whether or not the number of access points that have been specified is plural. When the number of access points that have been specified is one (NO), the process branches to Step S409. On the other hand, when the number of access points that have been specified is plural (YES), the process branches to Step S408. In Step S408, the connection destination determination unit 314 refers to the access point score table 153 and specifies the access point regarding which the radio wave intensity is the highest among the plurality of access points that have been specified. In Step S408, the connection processing unit 315 transmits the probe response instruction to the access point specified by the connection destination determination unit 314, and the processing is ended in Step S410.

In the second example embodiment, besides the effects obtained in the first example embodiment, the following effects are obtained. That is, the access point management apparatus 30 determines the access point that should be connected to the connection request client and establishes the radio communication connection between the above access point and the connection request client. Therefore, it is possible to reduce the processing load of the access point compared with the example embodiment in which it is determined whether the access point that has received the probe request should be connected to the connection request client.

Third Example Embodiment

In a third example embodiment, the score calculation unit 113 according to the first example embodiment and the score calculation unit 313 according to the second example embodiment compare the maximum communication speed of the connection request client with the maximum communication speed of the connected client and calculates the score for giving the intermediate priority to the access point in which a difference between the maximum communication speeds of these clients is equal to or smaller than a threshold. This threshold may be a desired value (0 or larger) where it is recognized that the maximum communication speeds are substantially the same. Further, the score calculation unit 113 calculates the score that gives a low-order priority to the access point in which a difference between the maximum communication speeds of these clients exceeds the threshold. That is, when the maximum communication speeds of these clients are substantially the same even when they are not completely the same, the score calculation unit 113 gives the intermediate priority to the access point. Accordingly, according to the third example embodiment, besides the effects obtained in the first and second example embodiments, the following effect can be obtained. That is, even when the maximum communication speed of the connection request client and the maximum communication speed of the connected client are substantially the same, the intermediate priority can be given to the access point, and the number of candidates of the access points that can reduce the round-trip time between the client and the access point can be increased.

Fourth Example Embodiment

While the case in which one connected client establishes the radio communication connection with an access point in the communication system 100 has been described in the aforementioned example embodiments, when a plurality of connected clients establish the radio communication connection with the access point, it is possible that the waiting time of a client to be newly connected may increase as a result of data communication between these connected clients and this access point. Therefore, in the fourth example embodiment, when there are a plurality of connected clients in the access point whose score is to be calculated, the score calculation unit 113 according to the first example embodiment and the score calculation unit 313 according to the second example embodiment calculate the score for giving a low-order priority to the access point even when the maximum communication speed of the connection request client and the maximum communication speed of the connected client are the same. On the other hand, when there is one connected client in the access point whose score is to be calculated and the maximum communication speed of the connection request client is the same as the maximum communication speed of the connected client, the score calculation unit 113 calculates the score for giving the intermediate priority to the access point, like in the aforementioned example embodiments. Accordingly, an access point that has established the radio communication connection with one connected client preferentially establishes the radio communication connection with the connection request client over the access point that has established the radio communication connection with the plurality of connected clients. Therefore, it is possible to reduce the waiting time that is due to the data communication between another connected client and this access point (that is, waiting time of the newly connected client) and to reduce the waiting time that is due to the data communication between the newly connected client and this access point (that is, waiting time of the other connected client). Therefore, even in a case in which there is an access point that has established the radio communication connection with the plurality of connected clients in the communication system 100, the round-trip time between the client and the access point can be reduced.

Other Example Embodiments

While the CPU 110 extends the controller 111, the information sharing unit 112, the score calculation unit 113, the connection necessity determination unit 114, and the connection processing unit 115, which are program modules, to the RAM and executes them in the aforementioned example embodiments, the aforementioned processing may be executed by causing these program modules to be mounted on a logic circuit in other example embodiments. Further, while the maximum communication speed (theoretical value) of the client is used as a parameter for calculating the scores of the access points in the aforementioned example embodiments, a maximum communication speed (measured value) that the client is able to achieve may instead be used in the other example embodiments.

In the aforementioned examples, the program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), CD-ROM, CD-R, CD-R/W, and semiconductor memories (such as mask ROM, Programmable ROM (PROM), Erasable PROM (EPROM), flash ROM, RAM, etc.). The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

While the present disclosure has been described with reference to the example embodiments, the present disclosure is not limited by the above example embodiments. Various changes that may be understood by those skilled in the art may be made to the configurations and the details of the present disclosure within the scope of the present disclosure.

REFERENCE SIGNS LIST

10*a*~10*e* Access Point
20 Client
100 Communication System
112 Information Sharing Unit
113 Core Calculation Unit
114 Connection Necessity Determination Unit
115 Connection Processing Unit
30 Access Point Management Apparatus
312 Shared Information Acquisition Unit
313 Core Calculation Unit
314 Connection Destination Determination Unit
315 Connection Processing Unit

The invention claimed is:

1. A communication apparatus comprising:
information sharing means for transmitting/receiving, when a radio communication connection has been requested from a first client, information to be shared with an other access point;
score calculation means for calculating, for an access point and the other access point, scores indicating their priority as a destination to which the first client is connected using the information to be shared;
connection necessity determination means for determining whether or not it is necessary to establish a radio communication connection between the access point and the first client based on the scores calculated by the score calculation means; and connection processing means for establishing a radio communication connection between the access point and the first client when the connection necessity determination means has determined that it is necessary to establish the radio communication connection, wherein the information to be shared includes at least information indicating the presence or the absence of a second client that has already established the radio communication connection with either the access point or the other access point, and a communication speed of the first client and a communication speed of the second client, the score calculation means:
  calculates a score for giving a high-order priority to the access point or the other access point in which the radio communication connection with the second client has not been established based on the information indicating the presence or the absence of the second client;
  compares the communication speed of the first client with the communication speed of the second client, and calculates a score for giving an intermediate priority to the access point or the other access point in which these communication speeds are the same, or a difference between these communication speeds is equal to or smaller than a first threshold; and
  calculates a score for giving a low-order priority to the access point or the other access point in which these communication speeds are different from each other, or the difference between the communication speeds exceeds the first threshold, and the connection necessity determination means determines that it is necessary to establish the radio communication connection between the access point and the first client when the score of the access point is the highest among the scores calculated by the score calculation means.

2. The communication apparatus according to claim 1, wherein
  the information to be shared further includes an intensity of radio waves of the first client received by the access point and the other access point, and
  the score calculation means calculates a score that gives a high-order priority to the access point and the other access point regarding which an intensity of radio waves of the first client is equal to or larger than a second threshold and calculates a score that gives a low-order priority to the access point and the other access point regarding which an intensity of radio waves of the first client is smaller than a second threshold.

3. The communication apparatus according to claim 2, wherein the connection necessity determination means determines, when there the another access point that has a score that is the same as the score of the access point, that it is necessary to establish the radio communication connection between the access point and the first client when the intensity of radio waves of the first client that the access point has received is higher than the intensity of radio waves of the first client that the other access point having the same score as that of the access point has received.

4. An access point management apparatus comprising:
  shared information acquisition means for acquiring information to be shared from a plurality of access points;
  score calculation means for calculating, for the plurality of access points, scores indicating their priority as a connection destination of a first client who has requested a radio communication connection using the information to be shared;
  connection destination determination means for determining an access point that should establish a radio communication connection with the first client based on the scores calculated by the score calculation means; and
  connection processing means for establishing a radio communication connection between the access point determined by the connection destination determination means and the first client, wherein the information to be shared includes at least information indicating the presence or the absence of a second client that has already established the radio communication connection with an access point, and a communication speed of the first client and a communication speed of the second client, the score calculation means:
  calculates a score for giving a high-order priority to an access point in which the radio communication connection with the second client has not been established based on the information indicating the presence or the absence of the second client;
  compares the communication speed of the first client with the communication speed of the second client, and calculates a score for giving an intermediate priority to an access point in which these communication speeds are the same, or a difference between these communication speeds is equal to or smaller than a first threshold; and
  calculates a score for giving a low-order priority to an access point in which these communication speeds are different from each other, or the difference between the communication speeds exceeds the first threshold, and the connection destination determination means determines an access point whose score calculated by the score calculation means is the highest to be an access point that should establish a radio communication connection with the first client.

5. The access point management apparatus according to claim 4, wherein
  the information to be shared further includes an intensity of radio waves of the first client received by the plurality of access point, and
  the score calculation means calculates a score that gives a high-order priority to an access point regarding which an intensity of radio waves of the first client is equal to or larger than a second threshold and calculates a score that gives a low-order priority to an access point regarding which an intensity of radio waves of the first client is smaller than a second threshold.

6. A selective communication connection method for selectively establishing communication connection with a client, the method comprising the steps of:
  transmitting/receiving information to be shared with an other access point when a radio communication connection has been requested from a first client;
  calculating, for an access point and the other access point, scores indicating their priority as a destination to which the first client is connected using the information to be shared;
  determining whether or not it is necessary to establish a radio communication connection between the access point and the first client based on the calculated scores; and establishing the radio communication connection between the access point and the first client when it has been determined that it is necessary to establish the radio communication connection, wherein the information to be shared comprises at least information indicating the presence or the absence of the second client that has already established the radio communication connection with either the access point or the other access point, and a communication speed of the first client and a communication speed of the second client, the step of calculating the score comprises calculating a score for giving a high-order priority to the access point or the other access point in which the radio communication connection with the second client has not been established based on the information indicating the presence or the absence of the second client;

comparing the communication speed of the first client with the communication speed of the second client, and calculating a score for giving an intermediate priority to the access point or the other access point in which these communication speeds are the same, or a difference between these communication speeds is equal to or smaller than a first threshold; and calculating a score for giving a low-order priority to the access point or the other access point in which these communication speeds are different from each other, or the difference between the communication speeds exceeds the first threshold, and the step of determining whether it is necessary to establish the radio communication connection comprises determining that it is necessary to establish the radio communication connection with the first client when the score of the access point is the highest among the scores that have been calculated.

7. A non-transitory computer readable medium storing a selective communication connection program executed in a communication apparatus including an arithmetic apparatus, the selective communication connection program causing the arithmetic apparatus to perform the steps of:

transmitting/receiving information to be shared with an other access point when a radio communication connection has been requested from a first client;

calculating, for an access point and the other access point, scores indicating their priority as a destination to which the first client is determining whether or not it is necessary to establish a radio communication connection between the access point and the first client based on the scores; and establishing the radio communication connection between the access point and the first client when it has been determined that it is necessary to establish the radio communication connection, wherein the information to be shared comprises at least information indicating the presence or the absence of a second client that has already established the radio communication connection with either the access point or the other access point, and a communication speed of the first client and a communication speed of the second client, the step of calculating the score comprises calculating a score for giving a high-order priority to the access point or the other access point in which the radio communication connection with the second client has not been established based on the information indicating the presence or the absence of the second client;

comparing the communication speed of the first client with the communication speed of the second client, and calculating a score for giving an intermediate priority to the access point or the other access point in which these communication speeds are the same, or a difference between these communication speeds is equal to or smaller than a first threshold; and calculating a score for giving a low-order priority to the access point or the other access point in which these communication speeds are different from each other, or the difference between the communication speeds exceeds the first threshold, and the step of determining whether it is necessary to establish the radio communication connection comprises determining, when the score of the access point is the highest among the scores that have been calculated, that it is necessary to establish the radio communication connection with the first client.

* * * * *